US012590572B2

(12) United States Patent
Brown et al.

(10) Patent No.: US 12,590,572 B2
(45) Date of Patent: Mar. 31, 2026

(54) ACTUATOR

(71) Applicant: CAMBRIDGE MECHATRONICS LIMITED, Cambridge (GB)

(72) Inventors: Andrew Benjamin Simpson Brown, Cambridge (GB); James Howarth, Cambridge (GB); Robert Langhorne, Cambridge (GB); René Kist, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 471 days.

(21) Appl. No.: 18/010,342

(22) PCT Filed: Jun. 17, 2021

(86) PCT No.: PCT/GB2021/051549
§ 371 (c)(1),
(2) Date: Dec. 14, 2022

(87) PCT Pub. No.: WO2021/255469
PCT Pub. Date: Dec. 23, 2021

(65) Prior Publication Data
US 2023/0250810 A1 Aug. 10, 2023

(30) Foreign Application Priority Data

Jun. 17, 2020 (GB) ...................................... 2009270
Jul. 3, 2020 (GB) ...................................... 2010262

(51) Int. Cl.
*F03G 7/06* (2006.01)
*G03B 13/36* (2021.01)

(52) U.S. Cl.
CPC ....... *F03G 7/0614* (2021.08); *F03G 7/06143* (2021.08); *F03G 7/0665* (2021.08); *G03B 13/36* (2013.01)

(58) Field of Classification Search
CPC .. F03G 7/0614; F03G 7/06143; F03G 7/0665; F03G 7/067; G03B 13/36;
(Continued)

(56) References Cited

U.S. PATENT DOCUMENTS

| | | |
|---|---|---|
| 2002/0153729 A1 | 10/2002 | Beauchamp et al. |
| 2008/0128524 A1 | 6/2008 | Minor et al. |

(Continued)

FOREIGN PATENT DOCUMENTS

| | | |
|---|---|---|
| CN | 104335101 A | 2/2015 |
| CN | 108292077 A | 7/2018 |

(Continued)

OTHER PUBLICATIONS

GB Search and Examination Report for GB Application No. 2010262.0 dated Dec. 16, 2020.

(Continued)

*Primary Examiner* — Loren C Edwards
(74) *Attorney, Agent, or Firm* — Van Hoven PC; Stefan D. Osterbur; Joshua Van Hoven

(57) ABSTRACT

A shape memory alloy (SMA) actuator comprising: a support structure (10); a moveable part (20) movable relative to the support structure; plural SMA components (30) connecting the support structure and the movable part, the SMA components are operable to controllably change the position and/or orientation of the moveable part in two or more degrees of freedom; a controller (12) for controlling the operation of the SMA components in a first operating mode during normal operation and a second operating mode in response to an event; and means configured to, during the second operating mode, maintain at least partial control of the moveable part with a subset of the plural SMA components.

16 Claims, 8 Drawing Sheets

(58) Field of Classification Search
CPC .... G03B 2205/0007; G03B 2205/0046; G03B
2205/0076; G03B 3/10; G03B 30/00;
G02B 27/646; H04N 23/55
See application file for complete search history.

(56) References Cited

U.S. PATENT DOCUMENTS

| | | | |
|---|---|---|---|
| 2013/0002933 A1* | 1/2013 | Topliss | H04N 23/60 |
| | | | 310/306 |
| 2018/0348593 A1 | 12/2018 | Brown | |

FOREIGN PATENT DOCUMENTS

| | | |
|---|---|---|
| WO | 2007134088 A2 | 11/2007 |
| WO | 2010089526 A2 | 8/2010 |
| WO | 2011104518 A1 | 9/2011 |
| WO | 2016168624 A1 | 10/2016 |
| WO | 2020110091 A2 | 6/2020 |

OTHER PUBLICATIONS

International Search Report and Written Opinion for International Application No. PCT/GB2021/051549, dated Sep. 20, 2021 (4 pages).
International Preliminary Report on Patentability for International Application No. PCT/GB2021/051549, dated Dec. 29, 2022, 8 Pages.

* cited by examiner

ACTUATOR

CROSS-REFERENCE TO RELATED APPLICATIONS

This application is a national stage application under 35 U.S.C. § 371 of International Application No. PCT/GB2021/051549, filed Jun. 17, 2021, which claims priority of GB Patent Application Nos. 2009270.6, filed Jun. 17, 2020, and 2010262.0, filed Jul. 3, 2020. The disclosures of each of which are hereby incorporated by reference herein in their entireties.

FIELD

The present application relates to an actuator, particularly an actuator comprising a plurality of shape-memory alloy (SMA) components.

BACKGROUND

WO 2011/104518 A1 describes an actuator assembly that uses SMA wires to move a movable part supported on a support structure, for example to provide optical image stabilisation and/or autofocus (AF). In this example, eight SMA wires are arranged inclined with respect to a notional primary axis (or an optical axis) with a pair of the SMA wires on each of four sides around the primary axis. The SMA wires are connected so that on contraction two groups of four SMA wires provide a force with a component in opposite directions along the primary axis, so that the groups effect movement along the primary axis. The SMA wires of each group have 2-fold rotational symmetry about the primary axis, so that there are SMA wires opposing each other that effect lateral movement.

SUMMARY

The use of SMA wires in a miniature camera provides a precise and reliable way of controlling movement in a lens carriage. However, the SMA wires are delicate and they may sustain damage throughout the lifetime of the miniature camera. For example, the SMA wires may experience extensive wear if they are allowed to rub against each other, or they may break if they are subjected to excessive stress, high temperature or overstraining. In a multi-wire actuator, damage to any of the SMA wires may render the camera assembly unusable.

The present invention provides means for maintaining partial control in the lens carriage even if one or more wires are damaged and hence continuing to provide full or limited functionality in the camera.

According to a first aspect of the present embodiment, there is provided a shape memory alloy (SMA) actuator comprising:
- a support structure;
- a moveable part movable relative to the support structure;
- plural SMA components connecting the support structure and the movable part, the SMA components are operable to control (e.g. controllably change) the position and/or orientation of the moveable part in two or more degrees of freedom;
- a controller for controlling the operation of the SMA components in a first operating mode during normal operation and a second operating mode in response to an event; and means configured to, during the second operating mode, maintain at least partial control of the moveable part with a subset of the plural SMA components.

The SMA actuator may be a micro-actuator for a camera assembly or a mobile phone. The moveable part may comprise a lens having an optical axis along the longitudinal axis, wherein the SMA actuator provides one or more of: optical image stabilisation (OIS), autofocus (AF) and zoom for the camera assembly.

The SMA actuator may comprise one or more (e.g. elongate) SMA components which may be connected to the moveable part (e.g. a lens carriage) directly, or via a flexure. In the latter case, the motion caused by contraction of the SMA components may be transferred though the flexure.

The SMA components may be formed from any suitable shape memory alloy material, typically a nickel-titanium alloy (e.g. Nitinol), but they may also contain tertiary components such as copper. The SMA components may have any cross-sectional profile and diameter suitable for the application. For example, the SMA components may be SMA wires each having a cross section diameter of 25 µm, or 30 µm, or 35 µm, capable of generating a maximum force of between 120 mN and 400 mN whilst maintaining the strain in the SMA wire within safe limits (e.g. 2-3% reduction in length over original length). Increasing the diameter of each SMA wire from 25 µm to 35 µm approximately doubles the cross-sectional area of the SMA wire and thus approximately doubles the force provided by each SMA wire.

The plural SMA components may comprise a pair of SMA wires, four SMA wires arranged individually or in pairs, eight SMA wires arranged individually or in groups of four. Preferably, the plural SMA wires are evenly distributed around the four sides of the movable part. Preferably, the SMA wires are arranged with two-fold or four-fold symmetric around the optical axis.

Optionally, the event comprises detecting an abnormality in at least one of the SMA components and/or receiving a command at the controller. The controller may select the one or more selected SMA component based on the event.

During normal operation, the controller controls the moveable part in a first operating mode, where all of the SMA wires may be energised and in tension (e.g. because the SMA wires are opposed), to provide 'full' control of the moveable part. Upon detecting the occurrence of an event, the controller operates in a second operating mode to provide at least partial control of the moveable part. There may be further operating modes each tailored to a particular event, e.g. an abnormality in a particular wire or wires. The second operating mode may be stored in a memory or the controller, and may be a factory default or adjustable by a user input.

For example, one of more the SMA wires may be damaged, or in the worst case they may be snapped or broken. Such an abnormality may be detected by the controller where the measured resistance would be substantially higher than that detected during normal operation. Other abnormalities may comprise exceptionally high or low temperatures during operation, as well as incorrect positioning of the moveable part as a result of faulty or defective SMA wires. The controller may detect such an event by one or more of: resistance measurement circuitry, a position sensor such as a hall sensor, and other suitable means.

The event may also comprise receiving a command at the controller. The command may be a user input at an interface, or it may be a system generated input. For example, the event may be a command for energy conservation. Upon receiving such command, the actuator may be put into a second operating mode where one or more of the plural SMA wires are disabled to reduce power consumption.

In the second operating mode, the actuator maintains at least partial control of the moveable part. For example, the moveable part may have a reduced ability to move in one or more degrees of freedom, (although movement in these degrees of freedom would still generally be controlled, e.g. to restrict uncontrolled movement in these degrees of freedom). Alternatively, the movable part may remain movable in the same degrees of freedom as in the first operating mode, but with reduced performance, e.g. a reduced speed or a reduced movement range.

Optionally, the plural SMA components are divided into at least two sub-groups each configured to balance the tension in respective sub-group, and wherein during the second operating mode the controller is configured to disable all of the SMA components in the sub-group corresponding to the selected SMA component whilst operating the rest of SMA components. For example, each of the sub-group may comprise four SMA components each positioned on a respective side of the actuator, whilst maintaining tension each of the SMA components. The SMA wires in each of the sub-group may be described as a tension group. Advantageously, by disabling all of the SMA wires in the whole sub-group, such an arrangement may prevent tilting or any undesirable effect on the moveable part caused by unbalanced forces. The SMA wires in the other sub-group may remain operational to provide full (or partial) control of the moveable part.

Alternatively, the plural SMA components comprise pairs of SMA components arranged with rotational symmetry about an axis (which may extend through the support structure and the moveable part), e.g. the optical axis, and wherein during the second operating mode the controller is configured to disable both SMA components in the pair corresponding to the selected SMA component whilst operating the rest of SMA components. Similarly, oppositely arranged SMA wires may act in pairs to effect movement of the moveable part. Thus, by disabling the pair of SMA wires having the faulty SMA wire, it may advantageously mitigate the problem of unbalanced forces in the pair of SMA wires.

Alternatively, and preferably, during the second operating mode the controller is configured to disable the selected SMA component whilst operating the rest of SMA components. A biasing element, or a suspension system, may be required to act against the un-balanced force due to the disabling of the faulty/selected SMA component, in order to maintain tension in the rest of SMA components in the group. Advantageously, such an arrangement may allow the operation in all remaining SMA components.

Optionally, during the second operating mode the controller applies a different control algorithm to that applied during the first operating mode. For example, some or all of the SMA components that remain operable may contract differently (e.g. operating at higher temperature) to compensate for disabled SMA component. Advantageously, such an arrangement may improve, or even achieving full controllability of the moveable part.

Alternatively, during the second operating mode the controller may apply the same control algorithm to that applied during the first operating mode. That is, the controller continues using the same control algorithm for controlling the SMA components that remain operable.

Optionally, the aforementioned means comprises a biasing element for maintaining tension in the operable SMA components during the second operating mode. Optionally, during the second operating mode, the controller is configured to move the moveable element away from, or against, the biasing element. For example, the biasing element may be a spring plate, a magnet, or a gel that returns and/or retains the moveable part at a default (or central) position when the SMA components are not energised. Thus, during the second operating mode, the SMA components may cause the moveable part to move away from, or against, the biasing element, such that the bias force acting on the moveable part may balance the tension in the SMA components, as well as providing a returning force on the moveable part.

Optionally, the means comprises a suspension system, wherein the suspension system is configured to oppose movement in at least one degree of freedom in the moveable part to maintain control thereof. More specifically, the suspension system may be configured to limit rotation the moveable part about an axis (which may extend through the support structure and the moveable part, e.g. the optical axis)about which the plural SMA components are arranged in two- or four-fold rotational symmetry. Using the eight wires actuator of WO 2011/104518 as an example, in a normal operating mode, the movement of the moveable part may have 6 degrees of freedom based on operating two groups of two SMA wires. When an SMA wire is disabled, e.g. due to damage, the tension in the other three SMA wires in the same group would nominally (in the absence of any biasing force) reduce to zero. However, the other group of SMA wires may remain functional. Advantageously, by constraining rotational movement about an (optical) axis, e.g. rotZ, it may convert rotational movement rotZ into axial movement Z. Thus, such as arrangement may allow full control, or close to full control of movement along the axis.

Optionally, during the second operating mode, the controller is configured to move the moveable part towards an end of a moveable range in at least one degree of freedom, whilst maintaining control of the moveable part in other directions. The end of the said moveable range may be defined by an end stop and/or a wall. That is, the end stop and/or the wall may be placed in the path of the movement and prevents the moveable part from traversing beyond the said range of movement. In some cases, the end stop may be a sidewall of the support structure or a screening can. For example, during the second operating mode, the controller may be configured to move the moveable part such that the moveable part slides along a surface of the end stop and/or the wall to maintain control of the moveable part. That is, the SMA wires may drive the moveable part against the end stop in any degree of freedom, thus maintaining tension in the other operable SMA components. Upon actuating the remaining SMA wires, the moveable part may be driven along the surface of the end stop. Preferably, the end stop comprises a low friction surface such as a PTFE coating to reduce friction and to facilitate such movement.

Optionally, the means prioritises maintaining control in at least one degree of freedom over others during the second operating mode. Optionally, the means prioritises maintaining control along an axis extending through the support structure and the moveable part during the second operating mode, the plural SMA components are arranged in two- or four-fold rotational symmetry about the axis. Optionally the moveable part comprises a lens having an optical axis, wherein the means prioritises maintaining control along the optical axis during the second operating mode, so as to provide autofocus (AF).

According to a second aspect of the present embodiment, there is provided a method for controlling a shape memory alloy (SMA) actuator, the SMA actuator having plural SMA components connecting a support structure and a moveable part, wherein each SMA component is operable to control (e.g. controllably change) the position and/or orientation of the movable part in two or more degrees of freedom in a first operating mode, the method comprising:

detecting an event and (in response thereto) operating in a second operating mode, maintaining, during the second operating mode, at least partial control of the moveable part with a subset of the plural SMA components.

Optionally, the event comprises detecting an abnormality in at least one of the SMA components and/or receiving a command at the controller. The method may further comprise selecting one or more SMA components based on the event.

Optionally, the plural SMA components are divided into at least two sub-groups each configured to balance the tension in respective sub-group, the method comprising:

disabling all of the SMA components in the sub-group corresponding to the selected SMA component whilst operating the rest of SMA components in the second operating mode.

Alternatively, the plural SMA components comprise pairs of SMA components arranged with rotational symmetry about an axis (which may extend through the support structure and the moveable part), the method comprising:

disabling both SMA components in the pair corresponding to the selected SMA component whilst operating the rest of SMA components during the second operating mode.

Alternatively, and preferably, the method comprising disabling of the selected SMA component whilst operating the rest of SMA components during the second operating mode.

Optionally, the method comprising, during the second operating mode, applying a different control algorithm to that applied during the first operation operating mode.

Optionally, the method comprising driving the moveable element away, or against, the biasing element during second operating mode.

Optionally, the method comprising moving the moveable part towards an end of a moveable range in at least one degree of freedom, whilst maintaining control of the moveable part in other directions.

Optionally, the method comprising moving the moveable part such that the moveable part slides along a surface of an end stop and/or a wall to maintain control of the moveable part during the second operating mode, wherein the end stop and/or the wall defines the end of the moveable range.

Optionally, the method comprising, during the second operating mode, continue applying the same control algorithm to that during the first operation operating mode.

Features from the first aspect of the present invention may be combined with any feature in the second aspect.

BRIEF DESCRIPTION OF THE DRAWINGS

Certain embodiments of the present invention will now be described, by way of example only, with reference to the accompanying drawings, in which.

DETAILED DESCRIPTION

Figures 1, 2:
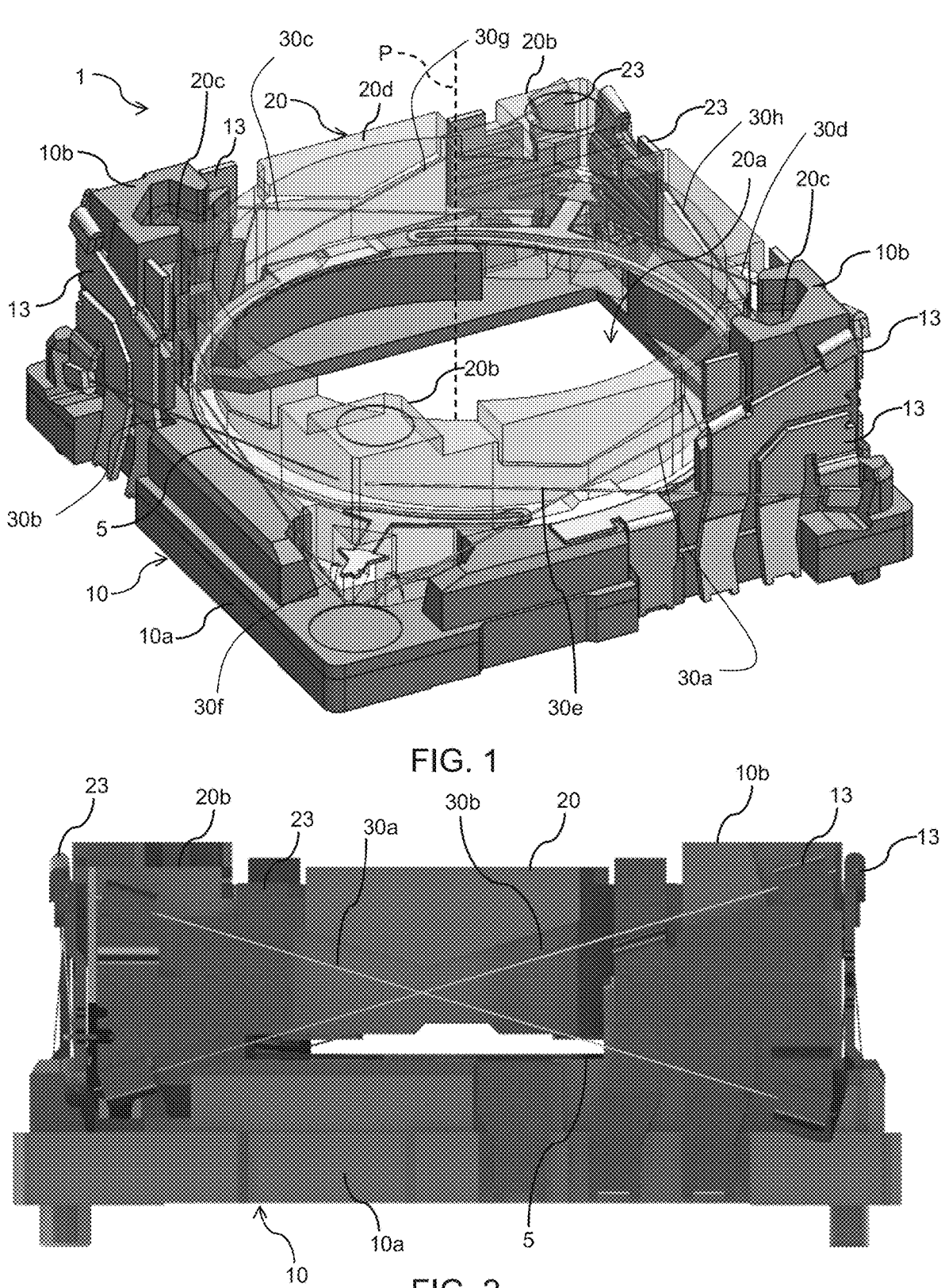
FIG. 1 is a perspective view of an example of an actuator assembly.
FIG. 2 is a side view of the actuator assembly of FIG. 1.
Figure 3:
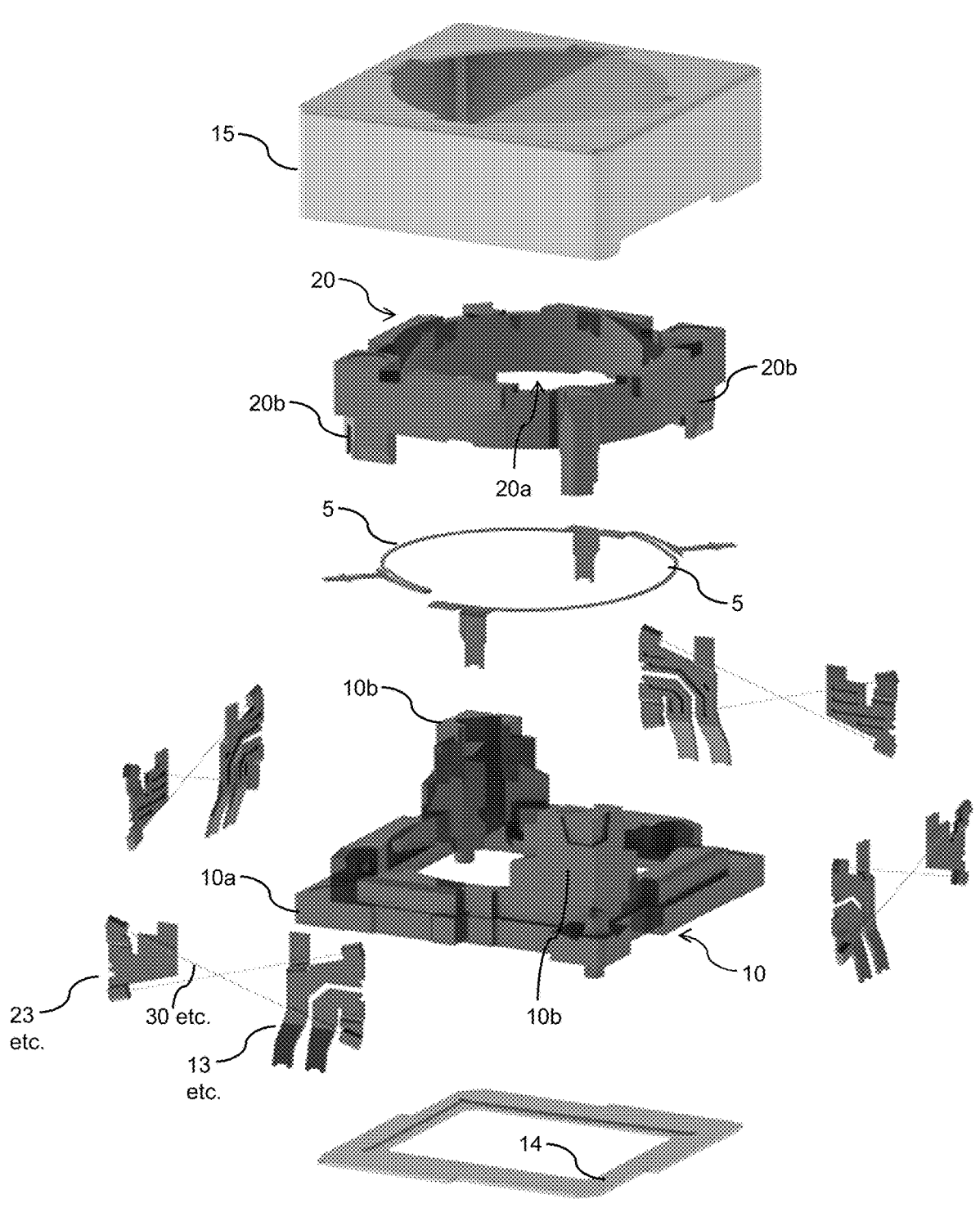
FIG. 3 is an exploded perspective view of the actuator assembly of FIG. 1.

Referring to FIGS. 1 to 4, a first example of an actuator assembly 1 suitable for use in a miniature camera will now be described.

The actuator assembly 1 includes a static part 10 and a moving part 20. The moving part 20 has a cylindrical opening 20a for holding a camera lens 25 (shown in FIG. 4 only). The camera lens 25 includes a lens or an assembly of lenses. Hence the moving part 20 is hereinafter referred to as a lens holder. As described in more detail below, the lens holder 20 is supported on the static part 10 by eight SMA wires 30. The lens holder 20 is capable of movement with respect to the static part 10, driven by the SMA wires 30, with six degrees of freedom, i.e. three orthogonal translational degrees of freedom and three orthogonal rotational degrees of freedom.

The position and orientation of various features of the actuator assembly 1 can be conveniently described with reference to a primary axis P defined with reference to the static part 20. Broadly speaking, the primary axis P corresponds to an axis of (two-fold) rotational symmetry of the actuator assembly 1. The primary axis P typically corresponds to the optical axis of the camera lens 25 when it is centrally arranged in the actuator assembly 1.

The actuator assembly 1 includes a set of two arms 5 connecting the static part to the lens holder 20. Amongst other things, the arms 5 provide an electrical connection from the static part 10 to the moving ends of the SMA wires 30 (i.e. the ends of the SMA wires 30 connected to the lens holder 20). Hence the arms 5 are sometimes referred to as common connections.

The actuator assembly 1 also includes a shield layer 14 and a screening can 15 (omitted from FIGS. 1 and 2). These components 14, 15 are affixed to the static part 10. The screening can 15 extends around the lens holder 20 with enough clearance to allow for movement of the lens holder 20. The screening can 15 protects the actuator assembly 1 against physical damage and the ingress of dust.

The static part 10 includes a base plate 10a and two static posts 10b provided on opposite corners of the base plate 10a. The static posts 10b may be affixed to the base plate 10a or formed integrally with the base plate 10a as one piece. Two crimp assemblies 13 are affixed to each of the two static posts 10b. The base plate 10a is configured to hold an image sensor (not shown).

The lens holder 20 includes two moving posts 20b aligned with the corners of the base plate 10a intermediate the static posts 10b. Two crimp assemblies 23 are affixed to each of the two moving posts 20b. (Two of the crimp assemblies 23 are omitted from FIG. 1.)

The SMA wires 30 are connected between the static part 10 and the lens holder 20 by being crimped at one end to a crimp assembly 13 of the static part and at the other end to a crimp assembly 23 of the lens holder 20. The crimp assemblies 13, 23 serve as both mechanical and electrical connections. The crimp assemblies 23 on the same moving post 20*b* are both electrically connected to one of the arms 5 (i.e. a common connection).

The SMA wires 30 have the same configuration around the lens holder 20 as the SMA wires in the actuator assembly described in WO2011/104518 A1. Specifically, two SMA wires 30 are arranged on each of four sides around the primary axis P, and are inclined with respect to the primary axis P (i.e. at an acute angle greater than 0°) in opposite senses to each other and crossing each other, as viewed perpendicular to the primary axis P. Thus, in particular, each of the SMA wires 30 is inclined with respect to the primary axis P and with respect to each other. Further details are provided in WO 2011/104518 A1, which is incorporated herein by this reference.

Selective contraction of the SMA wires 30 can drive movement of the lens holder 20 in any of the six degrees of freedom. Such movement is hereinafter sometimes referred to as three-dimensional (3D) movement. Contraction and expansion of the SMA wires 30 is generated by selectively applying drive signals thereto. The SMA wires 30 are resistively heated by the drive signals and cool by thermal conduction to the surroundings when the power of the drive signals is reduced.

Thus, the SMA wires 30 may be used to provide both an autofocus (AF) function by translational movement of the lens holder 20 along the primary axis P and an primary image stabilisation (OIS) function by translational movement of the lens holder 20 perpendicular to the primary axis P.

Figure 5:
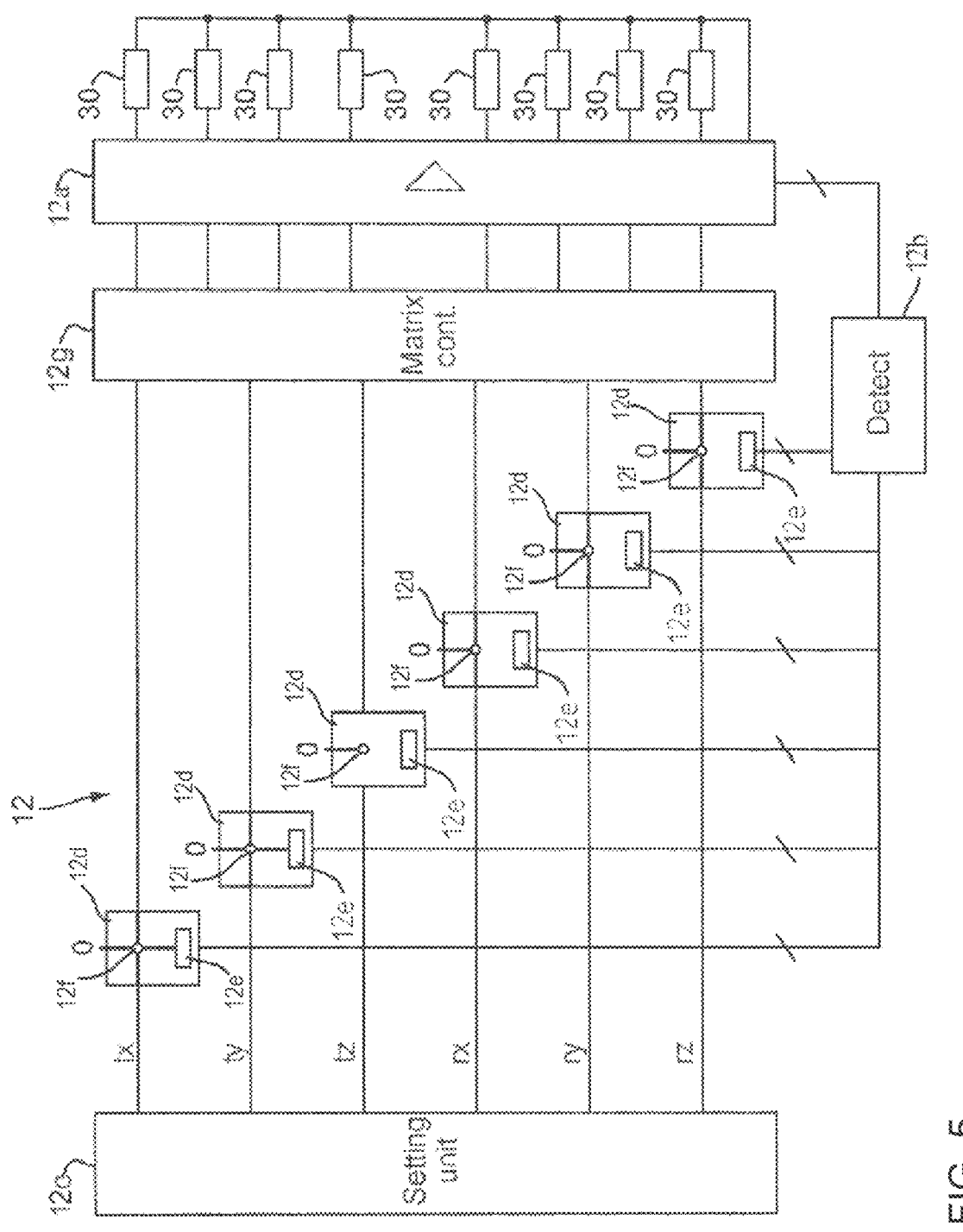
FIG. 5 is a schematic view of control circuitry which may be used in relation to any of the illustrated actuator assemblies.

FIG. 5 is a schematic view of control circuitry for monitoring and controlling each of the SMA wires 30. More specifically, the drive signals may be generated by control circuitry 12 and supplied to the SMA wires 30. Such control circuitry may receive an input signal representing a desired position for the lens holder 20 and generates drive signals having powers selected to drive the lens holder 20 to the desired position. The power of the drive signals may be either linear or varied using pulse width modulation. The drive signals may be generated using a resistance feedback control technique, in which case the control circuitry 12 measures the resistance of the SMA wires 30 and uses the measured resistance as a feedback signal to control the power of the drive signals.

More specifically, the control circuitry 12 includes drive circuitry 12*a* which generates a drive signal for each SMA wire 30 in accordance with a control signal for each SMA wire 30. The drive circuitry 12*a* may include a constant-voltage or constant-current source for each SMA wire 30. The drive signals generated by the drive circuitry 12*a* may be pulse-width modulation (PWM) signals.

The control circuitry 12 also includes detection circuitry 12*b* which detects measures of resistance of each of the SMA wires 30, the resistance of a wire being related to its length. Where the drive circuitry 12*a* includes constant-current sources, the detection circuitry 12*b* may include, for example, voltage-detection circuitry to detect the voltage across each SMA wire 30. Alternatively, or additionally, the detection circuit 12*b* may include current-detection circuitry.

The control circuitry 12 also includes a setting unit 12*c* which sets target resistance values. A target resistance value can be set for each wire or for different combinations of wire resistances. Moreover, combinations of wire resistances can be selected which correspond to the degrees of freedom of the 3D movement of the lens holder 20 with respect to the static part 10. In the example which will now be described, a target resistance value is set in respect of each degree of freedom, i.e. tx, ty and tz (representing translational positions along x, y and z axes) and rx, ry and rz (representing rotational positions around x, y and z axes, wherein the z axis corresponds to the primary axis P). The setting unit 12*c* sets the target resistance values according to the desired position and orientation of the lens holder 20, for example to perform autofocus by varying tz and/or OIS by varying tx and ty, while keeping rx, ry and rz constant.

The control circuitry 12 also includes an error detector 12*d* for each of the degrees of freedom. Each error detector 12*d* is supplied with a respective one of the target resistance values, and the detected measures of resistance of the SMA wires 30.

Each error detector 12*d* includes a feedback measure unit 12*e* which determines feedback values for the relevant degree of freedom. The feedback values are linear sums of the detected measures of resistance of the SMA wires 30 with scaling factors that correspond to the contributions of the SMA wires 30 to movement in the relevant degree of freedom. This depends on the geometry of the SMA wires 30. For instance, the rotational position of the lens holder 20 around the x axis, rotx, may be a function of the length and hence the resistance R of four SMA wires 30 labelled a, b, e and f, Moreover, the SMA wires 30 may have a symmetrical configuration such that rotx=K×(Ra−Rb+Re−Rf), where K is a constant of proportionality.

Each error detector 12*d* also includes a comparator 12*f* which determines an error between the target resistance value and the feedback value for the relevant degree of freedom. The error is further adjusted by an offset O. In this example, the adjustment is applied by offsetting the error determined by the comparator 12*f*. However, it will be appreciated that the adjustment may be carried out in different ways e.g. by offsetting the target resistance value or the feedback value.

The adjusted errors are supplied from the error detectors 12*d* to a matrix controller 12*g* which determines the control signals for each SMA wire 30 so as to control the powers of the drive signals in accordance with the adjusted errors. The matrix controller 12*g* uses a closed loop control algorithm to reduce the adjusted errors.

As will be appreciated, the setting unit 12*c*, the error detectors 12*d* and the matrix controller 12*g* may be implemented in one or more processors (operating in common or independently).

Further details are provided in WO 2017/098249 A1, which is incorporated herein by this reference.

Figure 4:
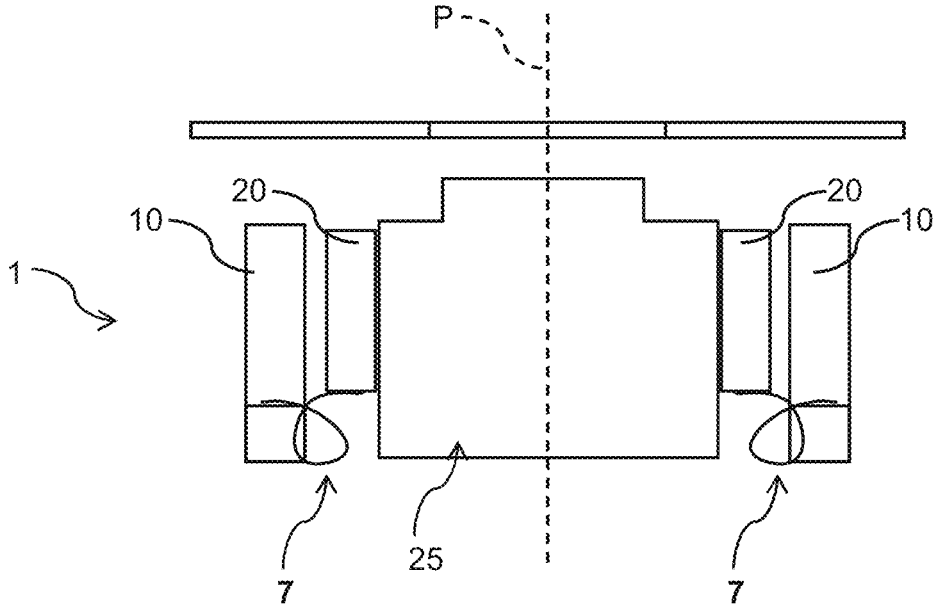
FIG. 4 is a schematic view of the actuator assembly of FIG. 1.

Referring in particular to FIG. 4, the actuator assembly further includes a biasing element 7 connected between the static part 10 and the lens holder 20 and configured to resist rotation of the lens holder 20 relative to the static part 10 about the primary axis P. The biasing element is merely shown schematically in FIG. 4.

In this example, the biasing element 7 is in the form of a non-rotating general bearing.

Figure 6A:
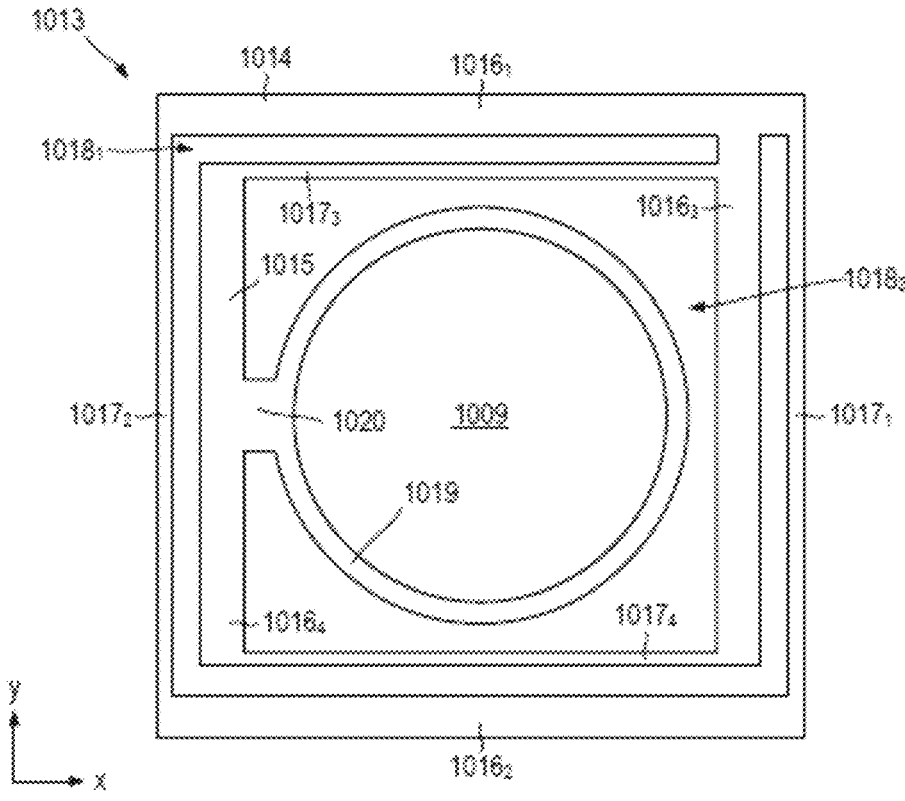
FIG. 6A is a plan view of a first non-rotating general bearing.

Referring in particular to FIG. 6A, a first example of a non-rotating general bearing 1013 (also referred to as a "two-by-two-bar link") is shown.

The first non-rotating general bearing 1013 includes an outer two-bar link 1014 which is mechanically in series with an inner two-bar link 1015. The outer two bar link 1014 is formed from first and second rigid portions 1016₁, 1016₂ elongated in a direction parallel to the first axis x and connected together in a direction parallel to the second axis y using first and second beam portions (flexures) $1017_1$, $1017_2$. The inner two-bar link 1015 is formed from third and fourth rigid portions $1016_3$, $1016_4$ elongated in a direction parallel to the second axis y and connected together in a direction parallel to the first axis x using third and fourth beam portions (flexures) $1017_3$, $1017_4$. The inner two-bar link 1015 is connected to the outer two bar link 1014 using the third rigid portion $1016_3$ which connects directly to the first rigid portion $1016_1$. With the exception of this connection, the inner two-bar link 1015 is separated from the outer two-bar link 1014 by a first gap $1018_1$ which provides space for lateral deflection of the first and second beam portions $1017_1$, $1017_2$. A central annular portion 1019 is located within the inner two-bar link 1015 and connected to the fourth rigid portion $1016_4$ by a rigid connecting portion 1020. Aside from the rigid connecting portion 1020, the central annular portion 1019 is separated from the inner two-bar link 1015 by a second gap $1018_2$ providing space for lateral deflection of the third and fourth beam portions $1017_3$, $1017_4$. The central annular portion 1019 defines a central aperture 1009.

The difference between "rigid" and "beam" portions in this specification is not absolute and is determined by relative flexural rigidity as defined e.g. by the respective cross-sectional areas. Beam portions are less resistant to bending, at least in the desired directions, than rigid portions.

Figure 6B:
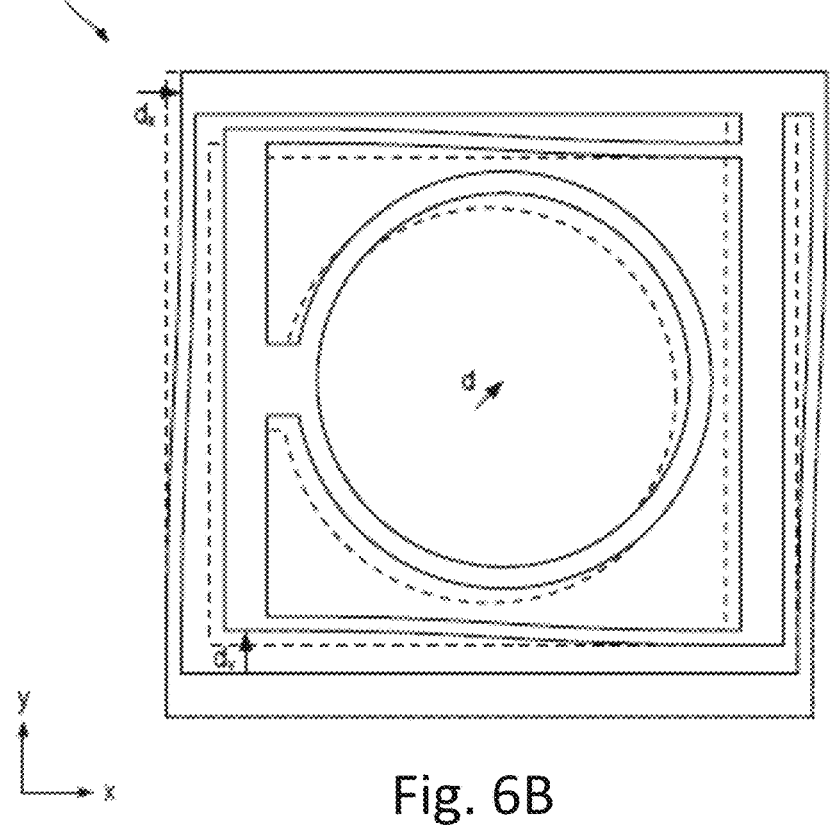
FIG. 6B is a plan view of a deformed state of the first non-rotating general bearing.

Referring also to FIG. 6B, a deformed configuration 1013b of the first non-rotating general bearing 1013 is shown.

If the second rigid portion 10162 is clamped to the support structure 10, then bending of the first and second beam portions $1017_1$, $1017_2$ permits movements Tx, Tz in directions substantially parallel to the first x and/or primary axes z, as well as rotations Rx, Ry about first x and/or second y axes. Similarly, relative to the third rigid portion $1016_3$, the fourth rigid portion $1016_4$ and connected central annular portion 1019 permits movements corresponding to Ty, Tz, Rx and/or Ry. Overall, this permits motion of the central annular portion 1019 relative to the clamped second rigid portion $1016_2$ corresponding to Tx, Ty, Tz, Rx and/or Ry, and constraining only rotation Rz about the primary axis z. For example, FIG. 10B illustrates a relative displacement d of the central annular portion 1019 relative to the second rigid portion $1016_2$ having a component $d_x$ parallel to the first axis x and a component $d_y$ parallel to the second axis y.

Figure 7:
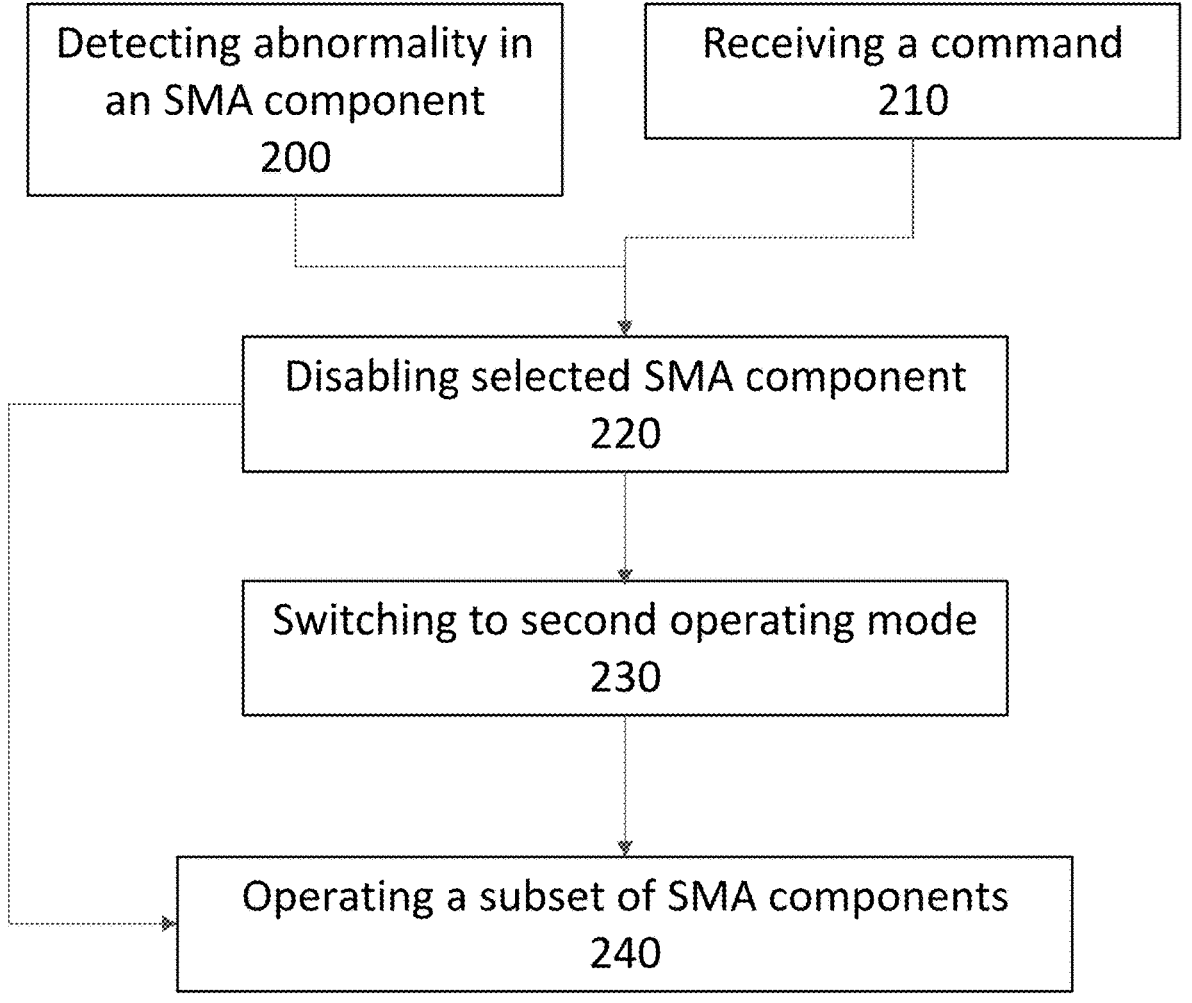
FIG. 7 is a flowchart illustrating a method of controlling the actuator assembly.

FIG. 7 is a flowchart illustrating a method of controlling the actuator assembly. During normal operation, the controller 12 (or control circuitry) controls the moveable part in a first operating mode, in which all of the SMA wires are energised, thus in tension, to provide full control of the moveable part.

The controller 12 is configured to continuously monitor the electrical resistance in each of the SMA wires 30, as described above. Upon detecting an abnormality in an SMA wire 200, e.g. abnormally high resistance in any given SMA wire 30, the controller 12 determines a fault has occurred and thereby disables 220 the faulty SMA wire 30. For example, over repeated use or by accident, one of more the SMA wires may be damaged, or in the worst case they may be snapped or broken. Other abnormalities may comprise exceptionally high or low temperatures. In some other embodiments, where a position sensor such as a Hall sensor (not shown) senses the moveable part 20 is not controlled to a desired position, the controller 12 may determine a fault has occurred and thereby disables 220 the faulty SMA wire 30.

In some other embodiments, the controller 12 may receive a command 210. The command may be a user input at an interface (not shown), or it may be a system generated input. For example, upon receiving such command, the actuator may disable 220 one or more of the plural SMA wires to reduce power consumption.

Upon detecting the occurrence of one or more of the above events, the controller 12 may operate in a second operating mode 230 to provide at least partial control of the moveable part 20. There may be further operating modes each tailored to a particular event, e.g. abnormality in a particular wire or a particular set of wires.

The second operating mode may be stored in a memory (not shown) or the controller 12, and may be a factory default or adjustable by a user input.

During the second operating mode the controller may apply a different control algorithm to that during the first operating mode. For example, some or all of the SMA components that remain operable may operate differently (e.g. operating at a higher temperature) to compensate for disabled SMA components. Advantageously, such an arrangement may improve, or even achieving full controllability of the moveable part.

Alternatively, during the second operating mode the controller may apply the same control algorithm to that during the first operating mode. That is, the controller may continue using the same control algorithm for controlling all the SMA components that remain operable.

Either way, the controller continues to operate a subset of the SMA components 240.

Using the actuator assembly 1 of FIG. 1 as an example, which control the moveable part 20 with two groups of SMA wires 30a-d,30e-f each forms an independent tension group. In such actuator 1, some level of position control can be maintained using fewer than all of the wires. In particular, the two groups of SMA wires 30a-d,30e-f may be independently operated. The SMA wires in the actuator 1 allow control of the moveable part 20 in 6 degrees of freedom. In the given application, AF function (axial movement along the optical axis P) is prioritised over the OIS function (lateral movement with respect to the optical axis P).

For example, when one of the SMA wires 30a fails to function, e.g. SMA wire 30 being broken or worn out. The controller 12 detects such defect by the abnormally higher resistance across an open circuit and disabled the broken wire 30a.

In a first example, the controller disables all other SMA wires 30b-d in the same group as the faulty wire 30a, and only operates the SMA wires 30e-h in the other group. More specifically, when SMA wire 30 is broken then the tension in the other three wires 30b-d in that tension group will nominally (in the absence of any spring forces) go to zero, thus non-functional. Such an arrangement advantageously allows the tension in the group of operational SMA wires 30e-h to be balanced and therefore prevents tilting or any undesirable effect on the moveable part 20 caused by unbalanced forces.

The SMA wires 30e-h in the other sub-group may remain operational to provide full (or partial) control of the moveable part. Indeed, the four SMA wires 30e-h in the remaining tension group control the following degrees of freedom: Tension, rotation (rotZ) about optical axis P, movement (Z) along optical axis P, rotation (rotX, rotY) about axes orthogonal to the optical axis P, and movement (X, Y) along axes orthogonal to the optical axis P.

With the use of a suspension system such as the non-rotating general bearing 1013 as shown in FIG. 6A, the controllability of the moveable part 20 can be significantly improved, even without the use of the group of SMA wires 30*a-d*. For example, when rotational motion (rotZ) about the optical axis P is constrained, the bearing 1013 converts the rotZ degree of freedom into axial movement (Z). Thus, this flexure could allow the AF to function even when one or more of SMA wire 30*a-d* in the same group is broken.

Similarly, when the controller receives a command to enter a low power mode, one of the two groups of SMA wires 30*a-d* may be disabled, with the movement control performed by the other group of SMA wires 30*e-h*. Advantageously, by switching off half the SMA wires 30*a-d*, power consumption of the actuator can effectively be halved. In certain scenarios, a reduced level of performance may be acceptable if low power consumption is a priority.

In a second example, the controller disables an SMA wire 30*c* that is in rotational symmetry to the faulty wire 30*a*, and only operates the rest of SMA wires 30*b*, 30*d-h*. The SMA wires 30*e-h* in the other sub-group may remain operational to provide full (or partial) control of the moveable part, albeit at a reduced speed. Oppositely arranged SMA wires may act in pairs to effect movement in the moveable part. Thus, by disabling the pair of SMA wires having the faulty SMA wire, it may advantageously mitigate the problem of unbalance force in the pair of SMA wires. To maintain tension in the remaining SMA wires 30*b*, 30*d*, biasing elements or a suspension system such as the bearing 1013 is required. Furthermore, the controller 12 may adapt a modified control algorithm to compensate for the disabled SMA wire 30*a*, e.g. increasing the power consumption, thus contraction, in other SMA wires.

In a third example, the controller disables the faulty SMA wire 30*a* operates the rest of SMA wires 30*b-h*. To maintain tension in the remaining SMA wires 30*b*-30*d*, biasing elements or a suspension system such as the bearing 1013 is required. Furthermore, the controller 12 may adapt a modified control algorithm to compensate for the disabled SMA wire 30*a*, e.g. increasing the power consumption in other SMA wires.

Other means of maintaining tension in the remaining operable SMA wires are described in the following examples.

Figure 8:
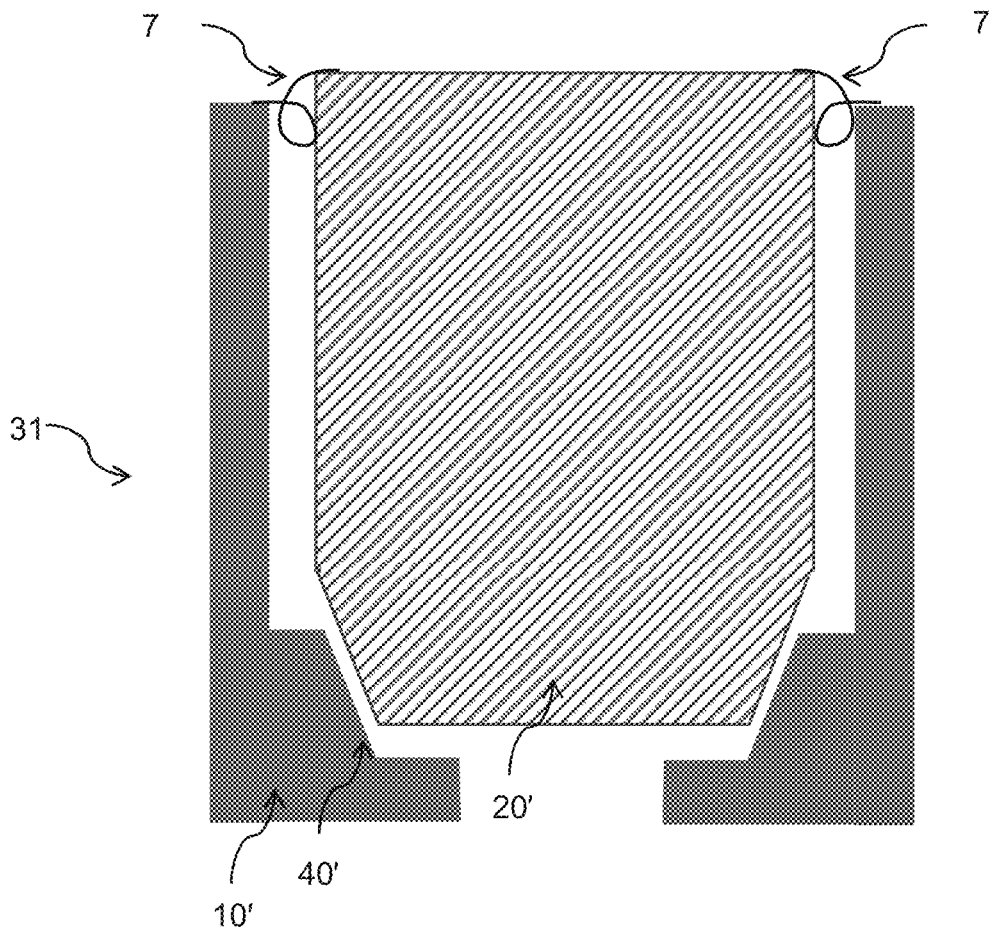
FIG. 8 is a schematic view of another example of an actuator assembly.

FIG. 8 is a schematic view of a second example of an actuator assembly.

The actuator assembly 31 includes the same or similar features as in the first example. In this example, the actuator assembly 31 includes a different biasing element 7 and also a set of end stops 40.

The biasing element 7 and the set of end stops 40 together hold the lens holder 20' in a substantially the central arrangement when the SMA wires 30 are not being driven (for any orientation of the actuator assembly 31). This function can be referred to as "unpowered centring".

The springs 7 are connected between the static part 10' and the lens holder 20' and are configured to bias the lens holder 20' such that, when the SMA wire 30' are not being driven, the lens holder 20' moves into contact with the end stops 40. In this example, the springs 7' are connected to an upper portion of the lens holder 20' and bias the lens holder 20' in a downwards direction along the primary axis P such that a lower portion of the lens holder 20' engages with the end stops 40.

The springs 7 may have any suitable properties to bias the lens holder 20' as described above. Compared to the arms 5 in the first and second examples, the stiffness of the springs 7 may be relatively low, particularly in directions perpendicular to the primary axis P, and so the effect on the operational movement of the lens holder 20' may also be relatively low.

In addition to the unpowered centering function described above, the spring (or biasing element) 7 may also (together with the control circuitry 12) enable the controller to provide position control with a subset of SMA wires 30. For example, when operating in a second operating mode, e.g. with one or more of the SMA wires 30 disabled, the remaining operational SMA wires 30 may contract to move the lens holder 20' against the spring 7, so as to achieve movement control along the optical axis. Alternatively, the spring 7 main continue biasing against the SMA wires 30, as such maintaining tension in the SMA wires that remain operable. That is, the force for returning the lens carriage 20' is provided by the spring 7, as well as tensioning the SMA wires.

In some examples, rather than there being separate springs 7, the arms 5 may perform the function of the springs 7 while also providing the electrical connection to the moving ends of the SMA wires 30.

In some other examples, a viscous fluid or a gel may be provided to resist slacking in a tension group caused by one or more non-operable wires and thereby maintain tension in the remaining operable SMA wires.

Figure 9A:
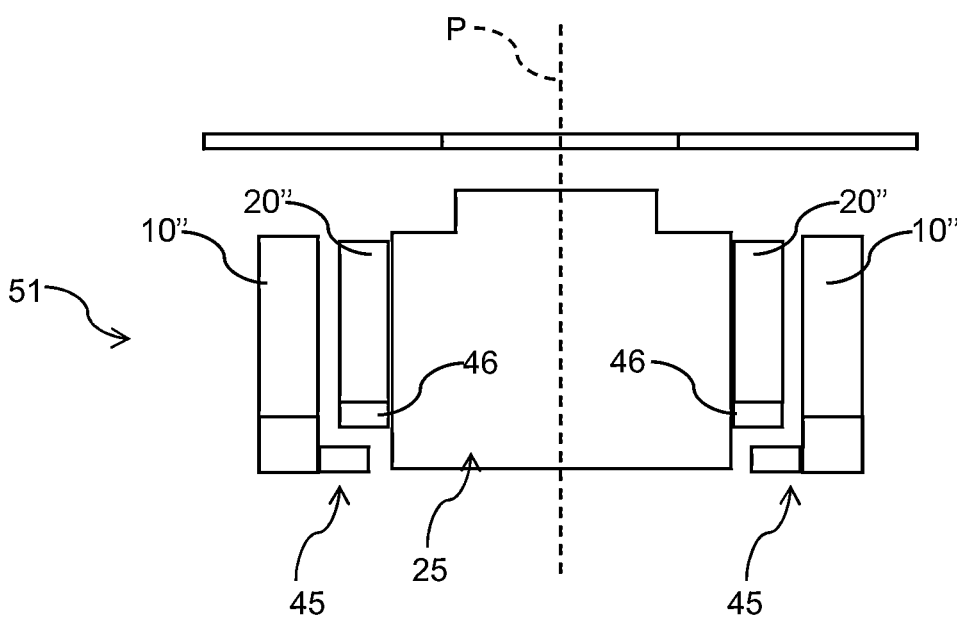
FIG. 9 is a schematic view of another example of an actuator assembly in an operation position (A) and in a held position (B).
Figure 9B:
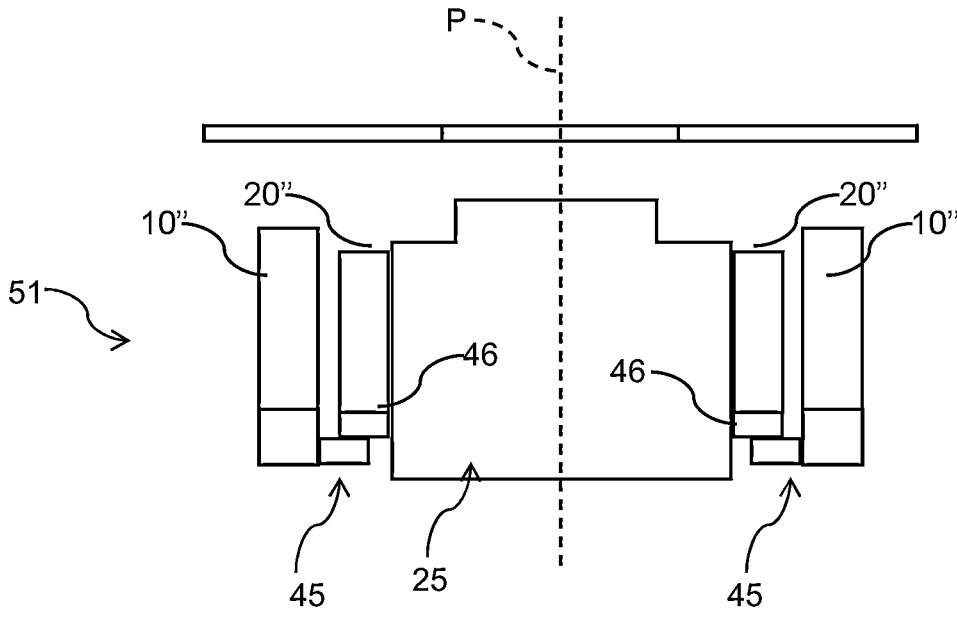

FIG. 9 is a schematic view of another example of an actuator assembly 51 in an operation position (A) and in a held position (B).

The actuator assembly 51 includes the same or similar features as in the first example. However, the arms 5 may be merely for providing the electrical connection to the moving ends of the SMA wires 30 and need not produce the above-described biasing force. Rather, in this example, the actuator assembly 51 includes magnetic elements 45, 46 on each of the static part 10" and the lens holder which together hold the lens holder 20" in the desired way.

In this example, there are a set of e.g. three permanent magnets 45 attached to the static part 10" and a set of three corresponding regions 46 of a ferromagnetic material e.g. steel attached to, or formed as part of, the lens holder 20".

The permanent magnets 45 may be magnetic quadrupoles, which may have a size that is comparable to the distance over which it was desirable for the magnetic force to act. Typically, this might be a few hundred microns.

The magnetic elements 45, 46 on the respective parts are relatively far from each other (and hence the forces between them are relatively low) when the lens holder 20" is in its range of operating positions and/or orientations (see FIG. 9A).

The magnetic elements 45, 46 on the respective parts are relatively close to, or are in contact with, each other (and hence the forces between them are relatively high) when the lens holder 20 is in a held position (see FIG. 8B).

The actuator assembly 51 is to for use with, or includes, control circuitry configured, before unpowering the SMA wire 30, to move the lens holder 20" into the held position (or sufficiently close to a held position that the magnetic forces are high enough to pull the lens holder 20" into the held position).

In addition to the holding function described above, the magnets 45, 46 may also (together with the control circuitry 12) enable the controller to provide position control with a subset of SMA wires 30. For example, when operating in a second operating mode, e.g. with one or more of the SMA wires 30 disabled, the remaining operational SMA wires 30 may operate to move the lens holder 20" close to magnet 45, 46, so as to achieve movement control along the optical axis. That is, the force for returning the lens carriage 20", as well as tensioning the SMA wires, are provided by the magnets 45, 46.

In some other embodiments, the controller is configured to operate the moveable part when it is driven against an end stop and/or a wall. More specifically, the end stop and/or the wall defines the limit of a movement range. Thus, when the moveable part is driven against the end stop and/or the wall, at least one freedom of movement (i.e. towards the end stop and/or the wall) is limited, whilst it remains moveable in other directions (e.g. a direction perpendicular to the surface of the end stop and/or the wall). For example, if the end stop and/or the wall limits movement orthogonal to the optical axis, during the second operating mode, the controller may maintain position control on the moveable part at least along the optical axis, by allowing the moveable part to slide on the surface of the end stop and/or the wall. To reduce friction on such movement, the sliding surface of the end stop and/or the wall may be coated with a friction-reducing coating such as PTFE.

It will be appreciated that there may be many other variations of the above-described embodiments.

For example, the actuator assembly may be used in applications other than cameras.

The invention claimed is:

1. A shape memory alloy (SMA) actuator comprising:

a support structure;

a moveable part moveable relative to the support structure;

plural SMA components connecting the support structure and the moveable part, wherein the SMA components are operable to controllably change the position of the moveable part and/or the orientation of the moveable part in two or more degrees of freedom;

a controller for controlling the operation of the SMA components in a first operating mode during normal operation and a second operating mode in response to an event; and means configured to, during the second operating mode, maintain at least partial control of the moveable part with a subset of the plural SMA components;

wherein the event comprises detecting an abnormality in at least one of the SMA components and/or receiving a command at the controller, and wherein the controller selects one or more SMA components of the plural SMA components based on the event; and wherein during the second operating mode the controller is configured to disable the selected one or more SMA components whilst operating the rest of SMA components.

2. The SMA actuator according to claim 1, wherein the plural SMA components are divided into at least two sub-groups each configured to balance a tension in a respective sub-group of the at least two sub-groups, and wherein during the second operating mode the controller is configured to disable all of the SMA components in a sub-group of the at least two sub-groups corresponding to the selected SMA components whilst operating the rest of SMA components.

3. The SMA actuator according to claim 1, wherein the plural SMA components comprise pairs of SMA components arranged with rotational symmetry about an axis, and wherein during the second operating mode the controller is configured to disable both SMA components in a pair corresponding to the selected SMA components whilst operating the rest of SMA components.

4. The SMA actuator according to claim 1, wherein during the second operating mode the controller applies a different control algorithm to a control algorithm applied during the first operating mode.

5. The SMA actuator according to claim 1, wherein during the second operating mode the controller applies a same control algorithm to a control algorithm applied during the first operating mode.

6. The SMA actuator according to claim 1, wherein the means comprises a biasing element for maintaining tension in operable SMA components during the second operating mode.

7. The SMA actuator according to claim 6, wherein during the second operating mode, the controller is configured to drive the moveable part away from, or against, the biasing element.

8. The SMA actuator according to claim 1, wherein the means comprises a suspension system, wherein the suspension system is configured to oppose movement in at least one degree of freedom in the moveable part to maintain control thereof.

9. The SMA actuator according to claim 8, wherein the suspension system is configured to limit rotation of the moveable part about an axis about which the plural SMA components are arranged with two-or four-fold rotational symmetry.

10. The SMA actuator according to claim 1, wherein during the second operating mode, the controller is configured to move the moveable part towards an end of a moveable range in at least one degree of freedom, whilst maintaining control of the moveable part in other directions.

11. The SMA actuator according to claim 1, wherein the means prioritises maintaining control in at least one degree of freedom over others during the second operating mode.

12. The SMA actuator according to claim 1, wherein the means prioritises maintaining control along an axis extending through the support structure and the moveable part during the second operating mode, the plural SMA components are arranged in two- or four-fold rotational symmetry about the axis.

13. The SMA actuator according to claim 1, wherein the moveable part comprises a lens having an optical axis, wherein the means prioritises maintaining control along the optical axis during the second operating mode, so as to provide autofocus (AF).

14. A shape memory alloy (SMA) actuator comprising:

a support structure;

a moveable part moveable relative to the support structure;

plural SMA components connecting the support structure and the moveable part, wherein the SMA components are operable to controllably change the position of the moveable part and/or the orientation of the moveable part in two or more degrees of freedom;

a controller for controlling the operation of the SMA components in a first operating mode during normal operation and a second operating mode in response to an event; and means configured to, during the second operating mode, maintain at least partial control of the moveable part with a subset of the plural SMA components:

wherein during the second operating mode, the controller is configured to move the moveable part towards an end of a moveable range in at least one degree of freedom, whilst maintaining control of the moveable part in other directions: and wherein the end of the moveable range is defined by an end stop and/or a wall, and wherein during the second operating mode, the controller is configured to move the moveable part such that the moveable part slides along a surface of the end stop and/or a surface of the wall to maintain control of the moveable part.

15. A method for controlling a shape memory alloy (SMA) actuator, the SMA actuator having plural SMA components connecting a support structure and a moveable part, wherein each SMA component of the plural SMA components is operable to controllably change the position of the moveable part and/or the orientation of moveable part in two or more degrees of freedom in a first operating mode, the method comprising:

detecting an event and operating in a second operating mode, maintaining, during the second operating mode, at least partial control of the moveable part with a subset of the plural SMA components;

wherein the event comprises detecting an abnormality in at least one of the SMA components and/or receiving a command at a controller, and wherein the method further comprises selecting one or more SMA components of the plural SMA components based on the event; and wherein the plural SMA components are divided into at least two sub-groups each configured to balance a tension in a respective sub-group of the at least two sub-groups, the method comprising:

disabling all of the SMA components in a sub-group of the at least two sub-groups corresponding to the selected SMA components whilst operating the rest of SMA components in the second operating mode.

16. The method according to claim 15, comprising: during the second operating mode, applying a different control algorithm to a control algorithm applied during the first operation operating mode.

* * * * *